United States Patent
Oury

[11] 3,878,935
[45] Apr. 22, 1975

[54] TOWER-MOUNTED CONCRETE CONVEYOR

[75] Inventor: Robert F. Oury, Elmhurst, Ill.

[73] Assignee: Rotec Industries, Elmhurst, Ill.

[22] Filed: June 4, 1973

[21] Appl. No.: 366,983

[52] U.S. Cl. .................. 198/88; 198/119; 198/188; 198/192 A
[51] Int. Cl. ............................................ B65g 37/00
[58] Field of Search ............ 198/192 A, 93, 89, 88, 198/188, 97, 11, 9, 77, 90

[56] References Cited
UNITED STATES PATENTS

| | | | |
|---|---|---|---|
| 1,250,640 | 12/1917 | Patterson | 198/93 |
| 2,704,149 | 3/1955 | Huey | 198/89 |
| 3,251,449 | 5/1966 | Hoffmann | 198/9 |
| 3,543,916 | 12/1970 | Berk | 198/188 |
| 3,598,224 | 8/1971 | Oury | 198/88 |
| 3,664,516 | 7/1970 | Goudy | 212/144 |
| R24,611 | 2/1959 | Stamos | 198/192 A |

Primary Examiner—Evon C. Blunk
Assistant Examiner—Jeffrey V. Nase
Attorney, Agent, or Firm—Molinare, Allegretti, Newitt & Witcoff

[57] ABSTRACT

A tower supported conveyor system for conveying materials such as concrete to points of high elevation which includes a support platform mounted on a generally vertical support member; an outwardly extending support member; an endless conveyor belt mechanism, one end of which is pivotally connected to the support platform to allow horizontal and vertical movement of the conveyor; a truss support associated with the conveyor mechanism to prevent lateral bending; and multiple support cables connected to the outwardly extending support member and conveyor assembly to suspend the conveyor assembly below the support member. Preferably the vertical and outwardly extending support members are pivotally connected to allow adjustment of the position of the conveyor. In an additional embodiment, C-shaped support members provide further support for the conveyor by connecting the conveyor with additional support cables depending from the outwardly extending support member. The conveyor belt mechanism is preferably equipped with a side discharge plow to discharge concrete from the conveyor. In addition, the conveyor belt is supported by a pair of rollers arranged in a generally V-shaped and which are adapted to rotate about a vertical axis to alleviate belt misalignment.

9 Claims, 11 Drawing Figures

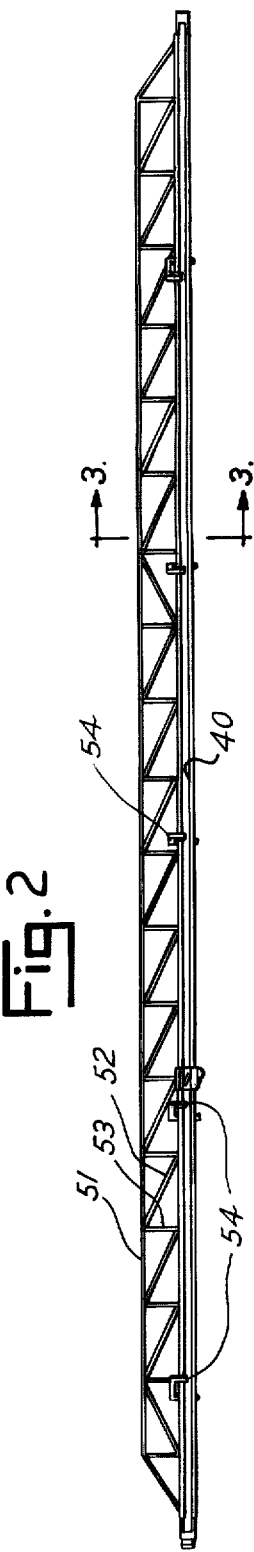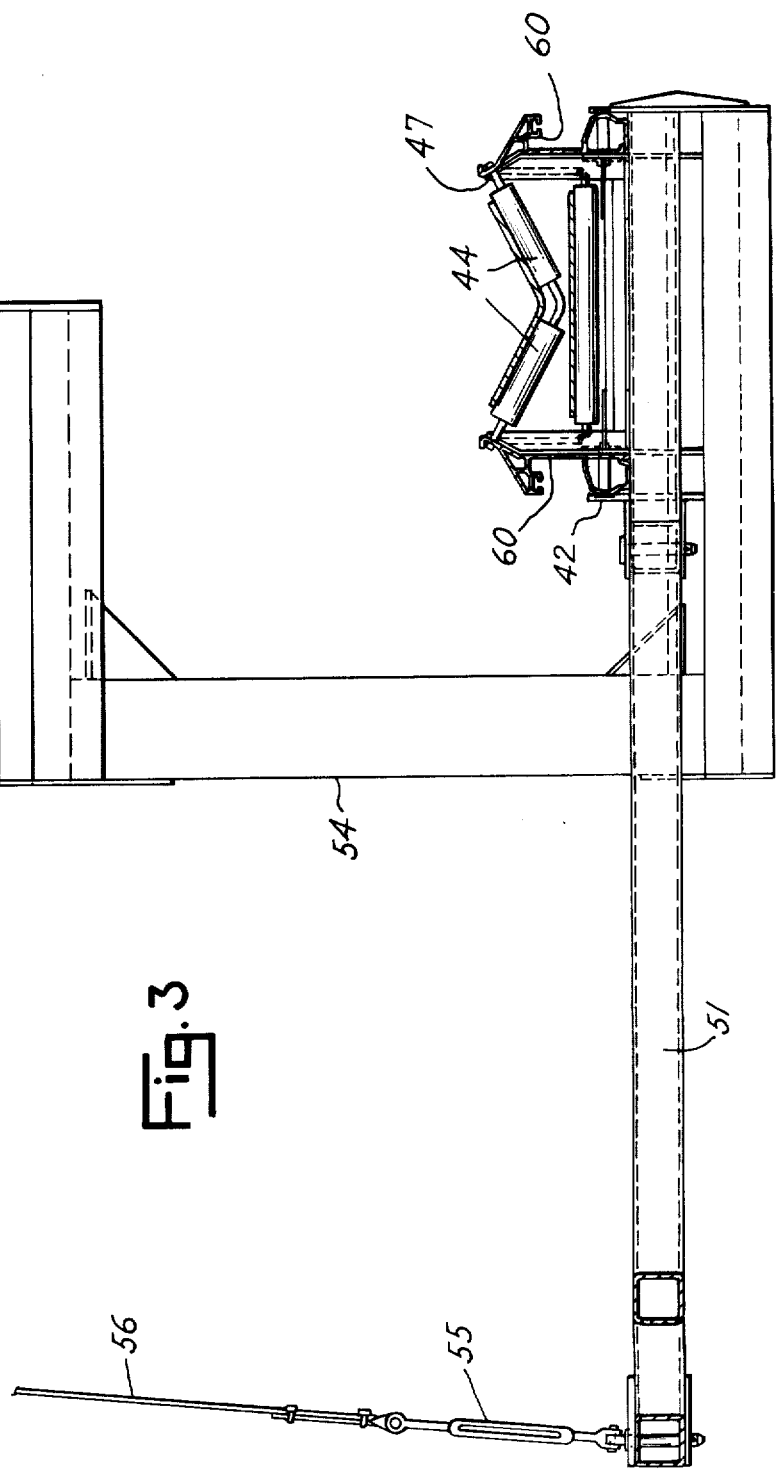

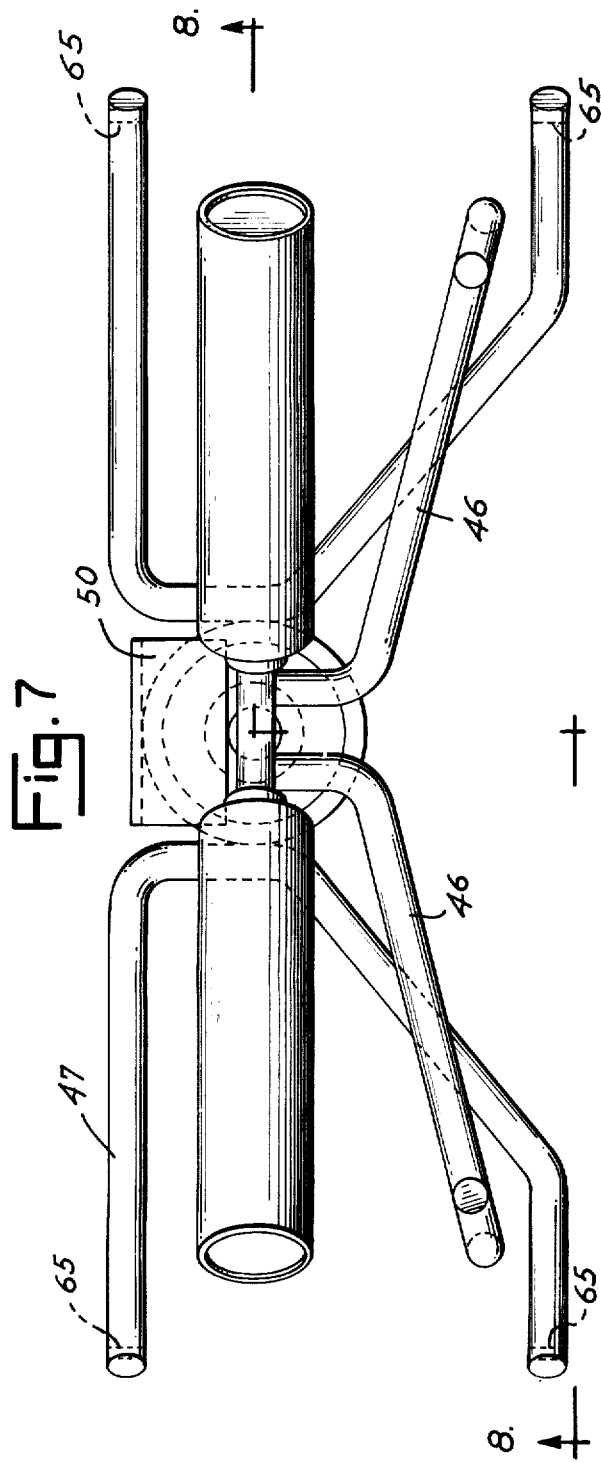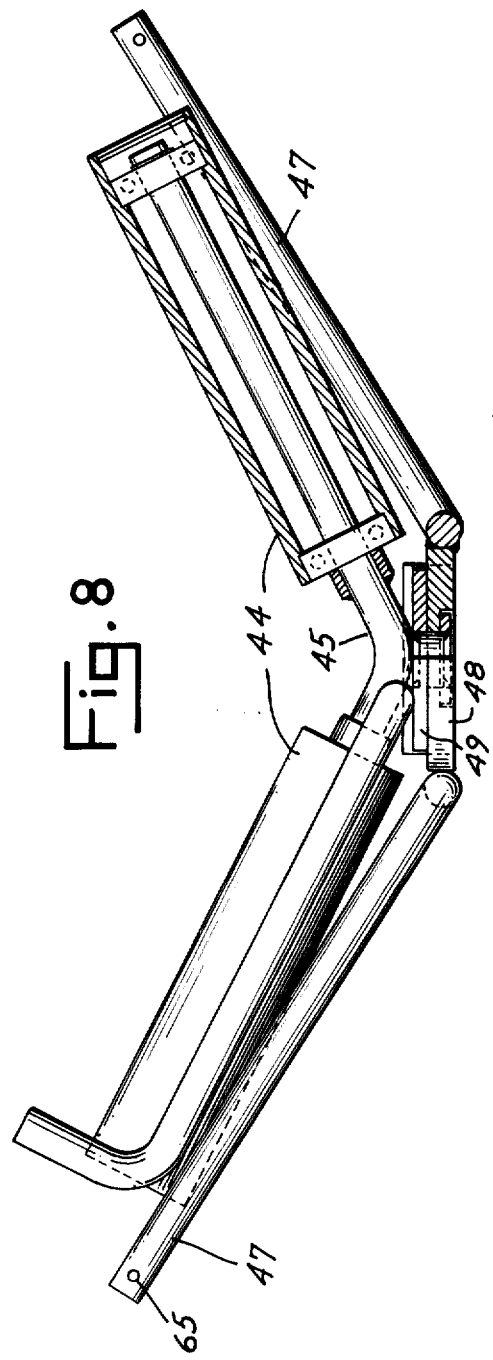

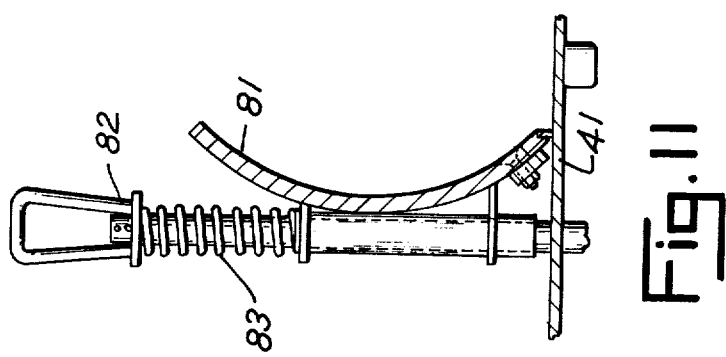
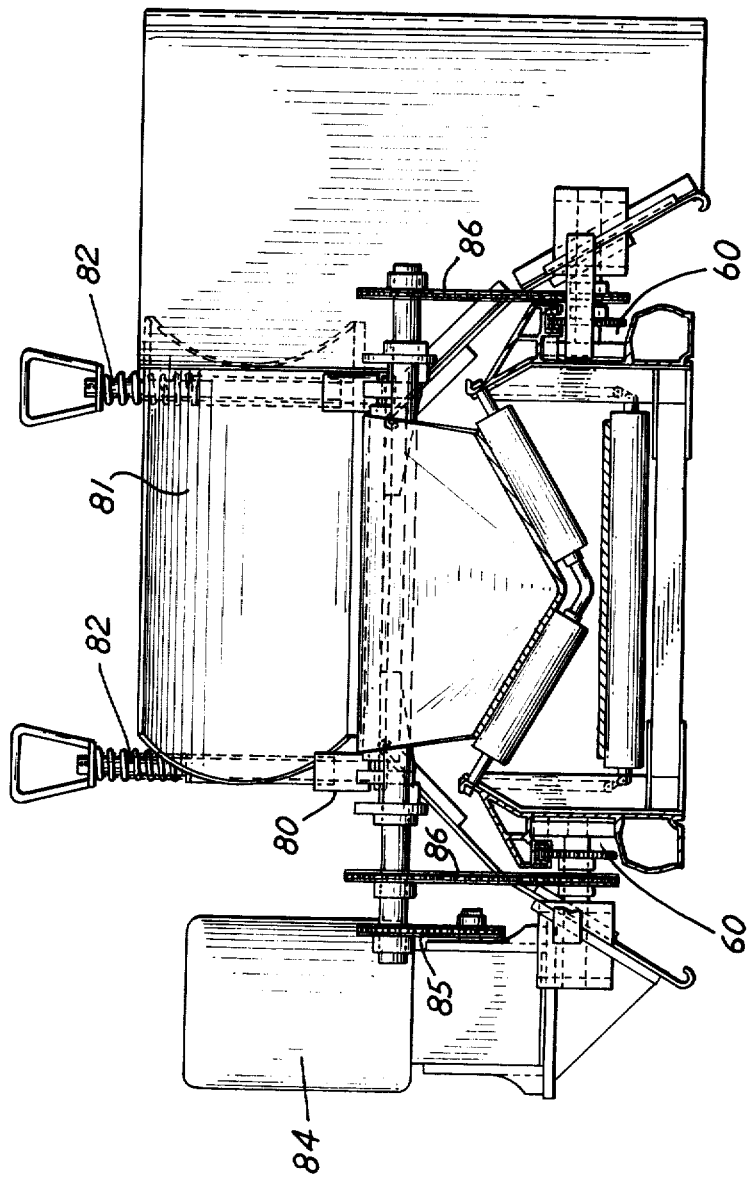

TOWER-MOUNTED CONCRETE CONVEYOR

BACKGROUND OF THE INVENTION

This invention relates to conveyor mechanisms, particularly conveyor mechanisms for delivering concrete to distant, elevated points on a construction project.

The use of belt type conveyors for transporting semi-fluid materials such as concrete mix, gravel, sand, etc., have been known and used for several years. Typical concrete conveyors are illustrated in U.S. Pat. Nos. 3,151,732; 3,171,534; 3,203,538; 3,590,983 and 598,224. 3,598,224.

These described conveyance mechanisms are useful for conveying concrete to a variety of remote positions on a construction project. For example, the boom mounted conveying means illustrated in my U.S. Pat. No. 3,598,224 can be extended, retracted, rotated and elevated to reach a multitude of points on a construction project. This conveyance means, however, cannot be effectively used to transport large amounts of concrete to highly elevated points. For example, if the boom is inclined at too steep of an angle, the semi-fluid concrete mass will not move up the conveyor belt at design rate. Further, the actual length of the conveyor, when fully extended, does not allow the end of the conveyor to reach the top of, or high intermediate points on, the multistory buildings and parking ramps being constructed today.

The use of movable plows to discharge concrete laterally from the conveyor belt on infinite points on the conveyor have also been known to the art. Typical prior art plows are illustrated in U.S. Pat. Nos. 2,099,071; 3,156,170 and 3,590,983. These plows have not been generally used to discharge concrete from elevated conveyors and have been more generally utilized in level paving machines.

The art has also recognized that the idler rollers of concrete conveyors should be self-adjusting; that is, the idler rollers should cant in the direction of any belt misalignment to create a force which causes the belt to return to the center of the idler rollers. This is necessary to avoid loss of drive power to the conveyor belt. A typical self-adjusting idler roller is illustrated in my U.S. Pat. No. 3,590,983.

A conveyance apparatus suspended below a boom to convey materials to remote discharge points is illustrated in U.S. Pat. No. 1,331,464. This apparatus does not include a side discharge plow. It is not designed to extend great distances outward nor can the conveyor belt be rotated laterally relative to the boom. For example, the conveyor illustrated in U.S. Pat. No. 1,331,464 cannot be constructed to provide a suspended conveyor of great length since it would be subjected to excessive lateral forces. These forces in turn would cause the conveyor to horizontally collapse.

OBJECTS AND SUMMARY OF THE INVENTION

It is, therefore, an object of this invention to provide an improved apparatus for conveying semi-fluid material, such as concrete mix, to points of high elevation without many of the disadvantages of the prior art devices.

It is also an object of this invention to provide a mobile apparatus for conveyance of concrete to elevated heights wherein the concrete can be discharged at a variety of horizontally positioned discharge points at that height.

It is still a further object of this invention to provide an elongated, cable suspended conveyor frame wherein the conveyor frame is not subjected to lateral displacement or bending.

It is still another object of this invention to provide an improved idler roller assembly for a conveyor equipped with a side discharge plow that is self-adjusting to compensate for belt misalignment.

It is yet another object of this invention to provide an improved horizontal idler roler assembly for a discharge plow that raises a conveyor belt from a trough-shaped roller assembly for removal of concrete.

It is yet a further object of this invention to provide a novel cable and support system for suspending an elongated conveyor below a support member.

In a specific embodiment, therefore, the present invention relates to an apparatus for conveying a semi-fluid mass such as concrete which includes an outwardly extending elongated support member; a generally upwardly extending support member; a support means such as a platform mounted on one face of the upwardly extending support member; said support means preferably adjustable for vertical elevation; an endless elongated belt conveyor assembly one end of which is mounted on the support means to permit the other end of the conveyor to move horizontally and vertically; a truss support member secured to the conveyor assembly to prevent lateral bending of the conveyor assembly; and, multiple support cables connected to the first support member and conveyor assembly for supporting the conveyor assembly below the outwardly extending support member. Preferably, the outwardly and upwardly extending support members are pivotally connected together and comprise the vertical tower and jib boom of a rotatable, and possibly movable tower crane.

In another embodiment, the present invention relates to an improved self-adjusting idler assembly for a conveyor belt comprising a pair of rollers positioned to provide a V-shaped trough, said rollers positioned between the side frame of the conveyor frame wherein the support rollers are mounted so that the V-shaped roller assembly can rotate a predetermined distance about its center axis to automatically guide the conveyor belt back to the center of the trough if it becomes misaligned.

In a still further embodiment of this invention, there are provided improved horizontal idler rollers for raising and/or lowering a conveyor belt for conveying concrete out of a support trough to a movable plow transversing the belt at an acute angle wherein the belt is flattened for concrete removal. The particular improvement comprises providing an adjustment for the horizontal idler rollers so that they can be adjusted at an acute angle to the conveyor belt instead of being positioned perpendicular to the belt as now practiced. This allows the rollers to compensate for belt misalignment induced by the plow or other factors.

Other objects and embodiments will be found in the following more detailed description of the invention.

BRIEF DESCRIPTION OF THE DRAWINGS

A particularly preferred embodiment of this invention is illustrated in the accompanying drawing wherein:

FIG. 2 is a top plan view of the discharge conveyor and the supporting horizontal truss.

FIG. 3 is a detailed front sectional view of the conveyor and supporting truss taken along section lines 3—3 of FIG. 2.

FIG. 7 is a detailed enlarged top view of the roller support system for the discharge conveyor.

FIG. 8 is a detailed, enlarged front view of the roller support system for the discharge conveyor.

FIG. 10 is a detailed front view of the discharge conveyor and side discharge plow.

FIG. 11 is detailed enlarged view of the discharge plow taken along lines 11—11 of FIG. 9.

DETAILED DESCRIPTION OF THE DRAWINGS

Figure 1:
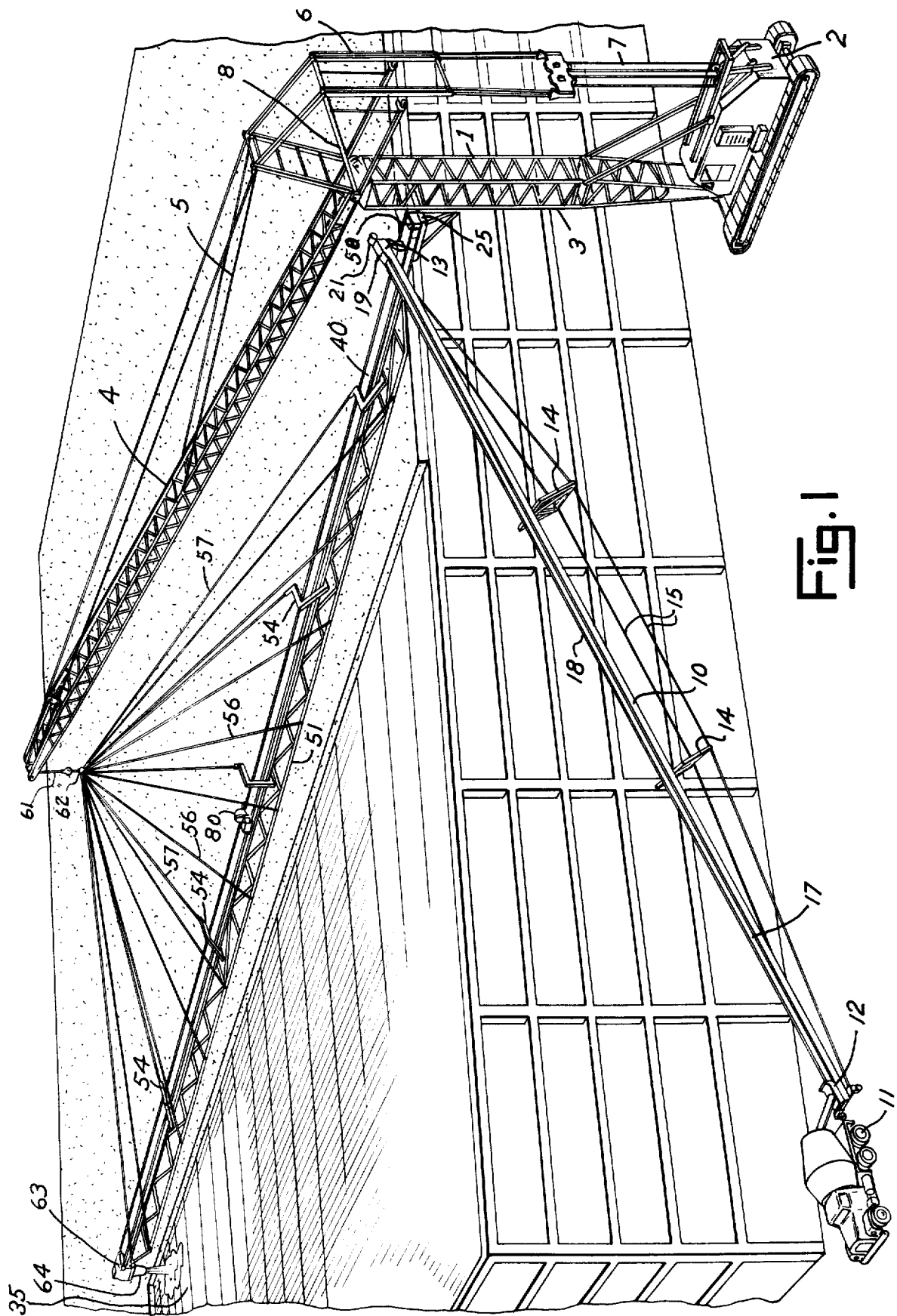
FIG. 1 is an overall perspective view of the tower mounted concrete discharge conveyor of the present invention.

Referring to FIG. 1, there is illustrated a conventional tower crane 1 comprising a cab 2, a generally vertical tower 3, and an outwardly extending jib boom 4. Jib boom 4 is supported by support cables 5 through support arms 6 and adjustable support cables 7. Jib boom 4 is pivotally connected by a conventional pivot connection 8 to vertical tower 3 in a manner well-known to those trained in the art. Vertical support cables 7 can be shortened and lengthened, as desired, to adjust the angle of the jib boom 4.

Discharge conveyor 40 is supported below jib boom 4 by a combination of C-supports 54, inboard cables 57, support truss 51, and outboard cable 56. Cables 56 and 57 are joined at common point 62 and in turn are connected to single support cable 61 adjustably connected to the end of jib boom 4. In other words, the discharge end 63 of discharge conveyor 40 can be moved up and down through a combination of support cable 61 and vertical support cables 7.

Discharge conveyor 40 is supplied by supply conveyor 10 of conventional design. More particularly, supply conveyor 10 comprises a conveyor frame 18, support braces 14, and support cables 15 which cooperate to prevent any bending or buckling of frame 18. Conveyor 10 also includes an endless conveyor belt 17 positioned in a U-shaped idler trough 16 (see FIG. 4), and a discharge funnel 19. In operation, concrete from concrete supply truck 11 is passed to the feed end 12 of supply conveyor 10 wherein it is conveyed by belt 17 to discharge end 13 of the conveyor. The concrete then passes through discharge funnel 19, down through chute 20 (see FIG. 6), before being discharged onto discharge conveyor 40. Supply conveyor 10 is powered by a suitable motor 21 and is pivotally connected above discharge conveyor 40 by a suitable pivot connection 22 that allows discharge end 13 of the supply conveyor 10 to rotate either horizontally or vertically.

Upon discharge of the concrete onto discharge conveyor 40, conveyor belt 41 conveys the concrete to either side discharge plow 80 or, if side discharge 80 is not mounted on the discharge conveyor 40, to forward tremie 64. In any event, the concrete is ultimately conveyed to a suitable form 35 by the discharge conveyor.

The support system for discharge conveyor 40 is shown in greater detail in FIGS. 2 and 3. Referring to these FIGURES, there is illustrated the rigid interconnection of support truss 51 to side frames 42 of the discharge conveyor 40. Outboard cables 56 are connected to the outer edges of support truss 51 by a suitable adjustable turnbuckle 55. Turnbuckle 55 can be adjusted to level discharge conveyor 40 and support truss 51. C support 54 is similarly rigidly connected to side frames 42 of discharge conveyor 40. Inboard cable 57 is connected to the outer top portion of C support 54 to provide further support for the discharge conveyor 40 and support truss 51.

Discharge conveyor 40 is preferably manufactured from a flexible frame such as aluminum. This allows the frame to flex and pick up any load imposed on the conveyor. It should be further noted that conveyor 40 is of great length and can reach numerous points on a horizontal plane remote from the discharge end of supply conveyor 10. For example, typical commercial embodiments of this invention often employ discharge conveyors of up to 250 feet or more in length.

Support truss 51 through the cooperation with angle braces 52 and perpendicular braces 53 prevents any lateral bending of the discharge conveyor. Further, the outboard cables 56 attached to the outer end of support truss 51 cooperate to further stabilize the conveyor and prevent excess flexing and rotation.

Figure 4:
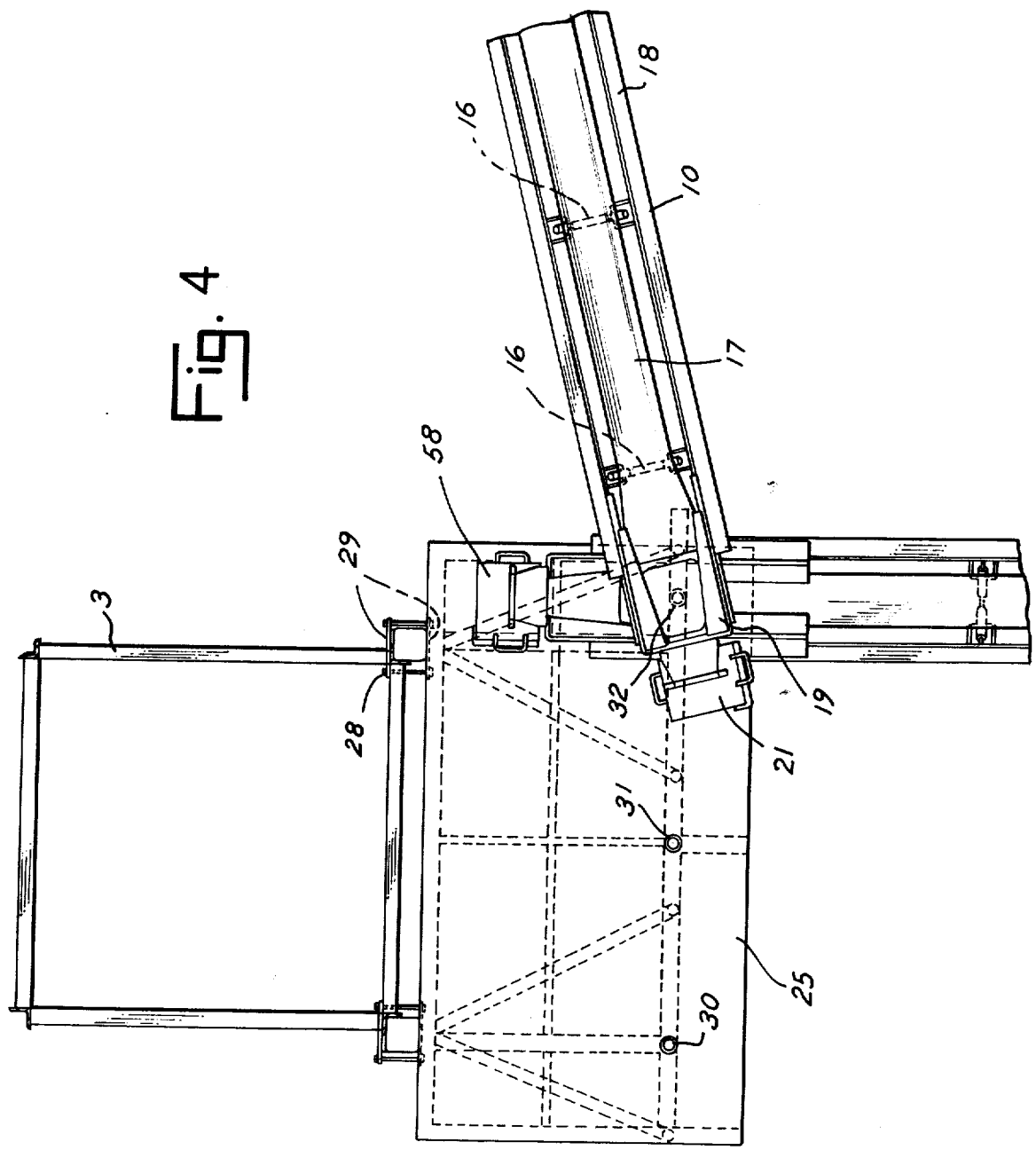
FIG. 4 is a detailed top plan view illustrating the interconnection of the supply conveyor, the tower, the tower platform and the discharge conveyor.
Figure 5:
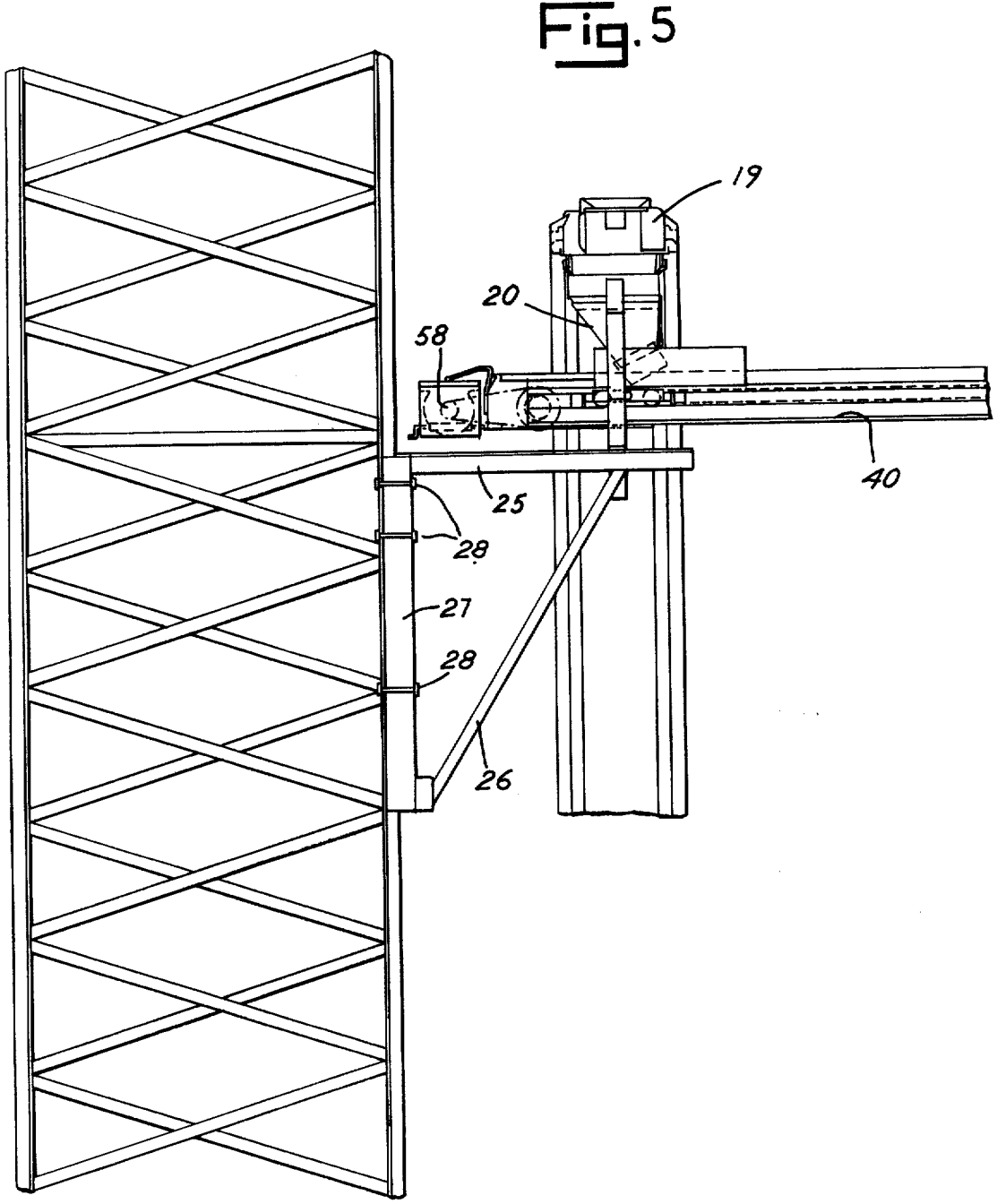
FIG. 5 is a detailed, side elevation view illustrating the interconnection of the supply conveyor, the tower, the tower platform and the discharge conveyor.
Figure 6:
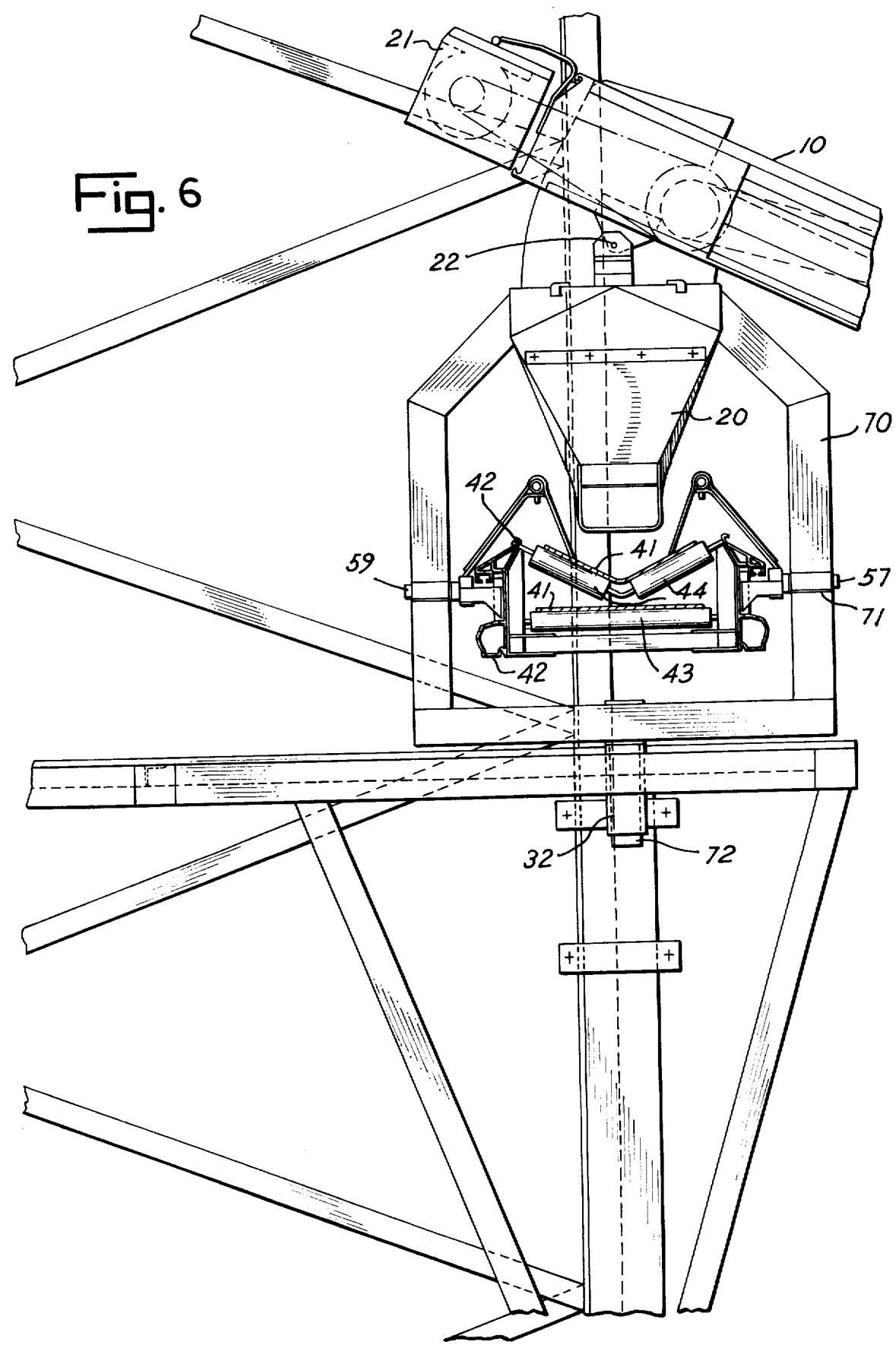
FIG. 6 is a detailed, front elevation view illustrating the interconnection of the supply conveyor, the tower, the tower platform and the discharge conveyor.

The interconnection between supply conveyor 10, discharge conveyor 40, and vertical tower 3 is shown in greater detail in FIGS. 4, 5 and 6. In particular, discharge conveyor 40 is mounted on support platform 25 through support structure 70. Support platform 25 mounted on the face of tower 3 includes support braces 26, horizontal support arms 27, bolts 28 and clamps 29. In particular, clamps 29 and bolts 28 cooperate to provide an adjustable interconnection between vertical tower 3 and platform 25, which allows the platform to be adjusted at various heights along the face of vertical tower 3. Support structure 70 can be positioned in either left mount 30 (FIG. 4), center mount 31, or right mount 32 of platform 25 as illustrated. Circular base arm 72 of support structure 70 descends through circular mount 32 to allow support 70 to rotate on platform 25. This off center positioning allows the discharge conveyor freedom to rotate without interference from tower 3. Discharge conveyor 40 is interconnected to support structure 70 through rotatable support arms 59 that are rigidly connected to the frame of the discharge conveyor. These support arms of the discharge conveyor, in turn, are rotatably positioned in openings 71 in support structure 70 and allow the discharge end 63 of conveyor 40 to be lowered or elevated as desired. As discussed earlier, supply conveyor 10 is pivotally connected, to pivot both vertically and horizontally, to the top of support structure 70 by pivot connection 22. Through the rotatable connection of the discharge conveyor to platform 25 at right mount 32 via support structure 70, the rotatable connection of the back end of the discharge conveyor through support arms 59 to the sides of support structure 70, and the pivotal connection via pivot 22 of Supply conveyor 10 to discharge conveyor 40, the discharge conveyor, and supply conveyor can be moved independently of each other.

As illustrated, discharge conveyor 40 is mounted in right mount 32. Discharge conveyor 40 can be also mounted in center mount 31 or left mount 30. Preferred are offset mountings in either mount 30 or 32 as indicated. This allows the supply conveyor to traverse above platform 25 with minimum interference with vertical tower 3.

The specific support structure for the conveyor belt 41 of discharge conveyor 40 is illustrated in detail in FIGS. 6, 7 and 8. Referring first to FIG. 6, it is seen that conveyor belt 41 is supported in a V-shaped trough formed by idler rollers 44. These idler rollers 44 are positioned every 15–20 feet along the length of the discharge conveyor for support of belt 41. The bottom portion of endless conveyor belt 41, on its return to the back end of the conveyor, is supported on conventional horizontal bottom rollers 43.

Referring next to FIGS. 7 and 8, there is illustrated in detail the V-shaped idler rollers as formed by a pair of bent, interconnected support rods 47 having openings 65 positioned on each end of the support rod. Support rods 47 extend through suitable openings in side frame 42 of discharge conveyor 40 and are held in position on the side frame 42 by placing suitable pins in openings 65. In more detail, support rods 47 are rigidly interconnected to a support base 48 which in turn supports a rotatable support member 49. Rotatable support member 49 includes rod 45 bent in the form of a V which supports thereon rollers 44. L-shaped rods 46 are similarly rigidly connected to rotatable member 49 with a spacer 50 positioned between support rods 47 to allow rollers 44 to rotate a predetermined distance either left or right before contacting support rods 47.

The ability of rollers 44 to rotate on rotatable member 49 allows the rollers to compensate for any lateral deflection or tendency of conveyor belt 41 to ride out of the trough as formed by rollers 44. In operation, when conveyor belt 41 inadvertantly moves to one direction, because of any misalignment, the edge of the belt will be intercepted by the base portion of L rods 46. This causes rollers 44 to shift forward by the rotation of rotatable member 49 and take a natural cant in the direction of the belt. This cant creates a directional force which induces the belt 41 to move to the center of the V-shaped idler roller assembly thereby providing a self-adjusting alignment feature. As a result of this self-adjusting feature, the weight of the concrete is in the proper center position of the belt trough and there is substantially no loss of drive power to the belt through motor 58. A further advantage of self-adjusting feature illustrated in FIGS. 7 and 8 is that the conveyor belt can be lifted out of and returned to the V-shaped trough formed by rollers 44 without substantial interference from L-shaped rods 46. In other words, when plow mechanism 80 travels along the length of the discharge conveyor 40 to pick up conveyor belt 41 from the trough, L-shaped rods 46 do not interfere with this belt removal.

Figure 9:
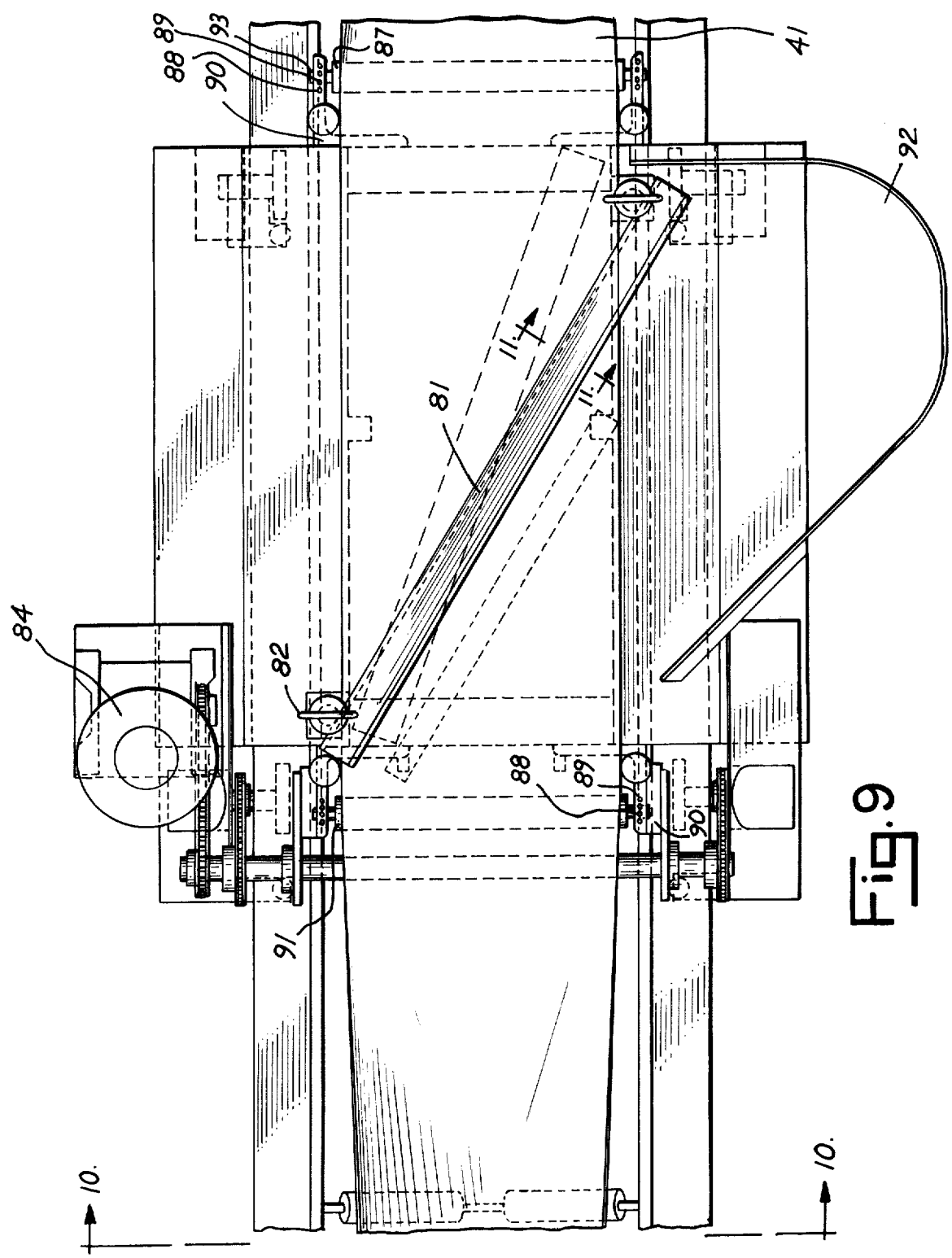
FIG. 9 is a detailed top view of the discharge conveyor and side discharge plow.

Plow mechanism 80, that travels the length of discharge conveyor 40, is substantially identical to the discharge plow illustrated in my U.S. Pat. No. 3,590,983 and is detailed in FIGS. 9, 10 and 11. Plow mechanism 80 includes a plow 81 positioned at an acute angle across belt 41 and discharges concrete laterally from the conveyor on the side opposite from support truss 51 onto side chute 92. Plow mechanism 80 moves back and forth along the length of discharge conveyor 40 through the action of motor 84, chain drives 85 and 86 as interconnected to side frame 42 through side channels 60 in the manner illustrated in detail in my U.S. Pat. No. 3,590,983. The leading edge of plow 81 is forced against the surface of belt 41 through the interaction of spring 83 positioned on support arm 82. Spring 83 insures that substantially all of the concrete is removed from the surface of the conveyor belt and does not accumulate thereon thereby leading to an undesired concrete build-up on the discharge conveyor 40.

As set forth hereinbefore, plow mechanism 80 removes belt 41 from the V-shaped trough formed by rollers 44 through the action of horizontal lead roler 91. Lead roller 91 flattens out the conveyor belt and allows the concrete to be removed therefrom by plow 81. The belt then passes over horizontal rear roller 87 and descends back into the V-shaped trough formed by rollers 44. This removal is facilitated by the non-binding characteristics of L rods 46 that provide the self-adjusting feature to keep the belt in the center of the V-shaped idler rollers.

A key feature of this invention is that lead rollers 91 and/or rear rollers 87 can be adjusted at an acute angle in relation to belt 41. This is in distinction to the roller assembly illustrated in U.S. Pat. No. 3,590,983 wherein these rollers are rigidly affixed perpendicular to the conveyor belt. Rollers 87 and 91 can be positioned at an acute angle relative to belt 41 by positioning openings 88 in frame 90 opposite a suitable opening in the support rod for the rollers. Pins 89 are positioned through openings 88 and through support rods 93 to hold rollers 87 and 91 in acute positions relative to belt 41. By positioning rollers 87 and/or 91 at an acute angle counters any misalignment induced by the scraping action of the plow blade 81 positioned acutely across belt 41.

What is claimed is:

1. An apparatus for conveying a flowable semi-fluid mass from a first point to a second distant point which comprises:

a first elongated outwardly extending support member having a first and second end;

a second elongated substantially upright support member having at least one face, said face having a center;

means for pivotally connecting said first end of said first support member to said second support member;

conveyor support means slideably and adjustably mounted on said face of said second support member;

elongated discharge conveyor means for conveying said semi-fluid mass to said second distant point, said conveyor means having a first and second conveyor end and a first and second conveyor side, said conveyor means including a substantially horizontal truss member secured to and extending from said first conveyor side to substantially avoid horizontal bending of said conveyor means, said truss member having an outer edge;

means for vertically and horizontally pivotally connecting said conveyor means to said support means, whereby said conveyor means is rotatable about said second support member and the elevation of said conveyor means is adjustable;

multiple support cable means for supporting said conveyor means from said second end of said first support member, whereby said conveyor means is operable in a substantially horizontal position; and means for conveying said semi-fluid mass to said first conveyor end from a supply source.

2. An apparatus as claimed in claim 1 wherein said multiple support cable means includes a series of support cables connecting said second end of said first support member and said outer edge of said horizontal truss, said cables being spaced along said horizontal truss.

3. An apparatus as claimed in claim 1 wherein said multiple support cable means includes a series of C-shaped support members rigidly connected to said conveyor means and a series of support cables connecting said second end of said first support member and said C-shaped support members, said C-shaped support members including a lower portion, a side portion and an upper portion, said conveyor means being positioned on and supported by said bottom portion, said side portion being adjacent said first conveyor side, whereby said C-shaped support member is open adjacent said second conveyor side.

4. An apparatus as claimed in claim 3 further comprising movable discharge plow means mounted on said conveyor means for removing said semi-fluid mass from said conveyor means towards said second conveyor side.

5. An apparatus as claimed in claim 1 wherein said conveyor connecting means is offset from said center of said face to substantially avoid rotational interference between said conveyor means and said second support member.

6. An apparatus as claimed in claim 1 wherein said conveyor connecting means includes a support structure horizontally pivotally mounted on said support means, said conveyor means being vertically pivotally connected to said support structure.

7. An apparatus as claimed in claim 1 wherein said supply conveying means includes a second conveyor means having a supply end and a discharge end, said discharge end communicating with said conveyor means.

8. An apparatus as claimed in claim 7 further comprising means for horizontally and vertically pivotally connecting said discharge end of said second conveyor means to said support means, whereby said conveyor means and said second conveying means move independently.

9. An apparatus as claimed in claim 1 further comprising movable discharge plow means mounted on said conveyor means for removing said semi-fluid mass at any point along said conveyor means towards said second conveyor side.

* * * * *